United States Patent
Stewart et al.

(10) Patent No.: US 10,025,915 B2
(45) Date of Patent: Jul. 17, 2018

(54) CONTACT SIGNATURE AUTHENTICATION OF USER OF DEVICE

(71) Applicant: Lenovo (Singapore) Pte. Ltd., Singapore (SG)

(72) Inventors: Aaron Michael Stewart, Raleigh, NC (US); Jeffrey E. Skinner, Raleigh, NC (US); Lance Warren Cassidy, Raleigh, NC (US); James Stephen Rutledge, Saratoga, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 14/098,141

(22) Filed: Dec. 5, 2013

(65) Prior Publication Data
US 2015/0161368 A1   Jun. 11, 2015

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 21/32 | (2013.01) |
| G06K 9/00 | (2006.01) |

(52) U.S. Cl.
CPC ......... *G06F 21/32* (2013.01); *G06K 9/00013* (2013.01); *G06K 9/00087* (2013.01); *G06K 9/00892* (2013.01)

(58) Field of Classification Search
CPC .................. G06F 21/32; G06F 3/0414; G06F 2203/04105; H04L 63/0861; H04L 9/3231; H04L 9/32; G07C 9/00158; G07C 9/00071; G07C 9/00087; G07C 9/00563; G06K 9/00006; G06K 9/00087; G06K 9/00013; G06K 9/00375; G06K 9/00382; G06K 9/00885; G06K 9/00892; G06K 2009/00395
USPC ........................................................ 713/186
See application file for complete search history.

(56) References Cited

U.S. PATENT DOCUMENTS

| | | | |
|---|---|---|---|
| 8,724,856 B1* | 5/2014 | King | G06K 9/00221 340/5.82 |
| 8,904,479 B1 | 12/2014 | Johansson et al. | |
| 2004/0031180 A1 | 2/2004 | Ivanov | |
| 2004/0151346 A1* | 8/2004 | Weiss | 382/115 |
| 2005/0271258 A1* | 12/2005 | Rowe | G06K 9/00046 382/124 |

(Continued)

OTHER PUBLICATIONS

Zhang, D., et al., Online joint palmprint and palmvein verification, Expert Systems with Applications (2010), Sep. 3, 2010.*

(Continued)

*Primary Examiner* — Shewaye Gelagay
*Assistant Examiner* — Amie C Lin
(74) *Attorney, Agent, or Firm* — Ference & Associates LLC

(57) ABSTRACT

A method including receiving sensed information corresponding to a contact signature of a user holding a device, generating a contact signature from the sensed information, comparing the contact signature to a library of contact signatures, and authenticating the user based on the comparison to provide access to functions on the device.

15 Claims, 3 Drawing Sheets

(56) References Cited

U.S. PATENT DOCUMENTS

| | | | |
|---|---|---|---|
| 2006/0018523 A1* | 1/2006 | Saitoh | G06K 9/001 382/124 |
| 2006/0215886 A1 | 9/2006 | Black | |
| 2007/0016088 A1* | 1/2007 | Grant | G06F 21/32 600/509 |
| 2008/0092245 A1 | 4/2008 | Alward et al. | |
| 2010/0225443 A1* | 9/2010 | Bayram et al. | 340/5.83 |
| 2010/0248822 A1* | 9/2010 | Migos et al. | 463/29 |
| 2011/0197270 A1 | 8/2011 | Kaufman | |
| 2011/0286639 A1* | 11/2011 | Ramrattan et al. | 382/124 |
| 2012/0286931 A1* | 11/2012 | Semba | G06K 9/00087 340/5.83 |
| 2013/0109369 A1 | 5/2013 | Forutanpour et al. | |
| 2013/0214801 A1* | 8/2013 | Hsiao | 324/692 |
| 2013/0232570 A1 | 9/2013 | Ota | |
| 2013/0288647 A1 | 10/2013 | Turgeman | |
| 2013/0347100 A1 | 12/2013 | Tsukamoto et al. | |
| 2014/0078086 A1 | 3/2014 | Bledsoe et al. | |
| 2014/0188561 A1 | 7/2014 | Tenbrock et al. | |
| 2014/0310804 A1 | 10/2014 | Apostolos et al. | |
| 2014/0317722 A1 | 10/2014 | Tartz | |
| 2014/0359757 A1 | 12/2014 | Sezan et al. | |
| 2015/0067822 A1* | 3/2015 | Randall | G06F 21/32 726/17 |
| 2015/0113633 A1 | 4/2015 | Yeom | |
| 2015/0116086 A1* | 4/2015 | Kim et al. | 340/5.83 |
| 2015/0137938 A1* | 5/2015 | Slaby | G06F 21/32 340/5.53 |
| 2015/0161369 A1 | 6/2015 | Weksler et al. | |

OTHER PUBLICATIONS

Karthik Nandakumar, Yi Chen, Anil K. Jain, Sarat C. Dass, Quality-based Score Level Fusion in Multibiometric Systems, The 18th International Conference on Pattern Recognition (ICPR'06).*

* cited by examiner

CONTACT SIGNATURE AUTHENTICATION OF USER OF DEVICE

BACKGROUND

With current in-market technology, secure authentication on a handheld smart device requires entering a PIN/password or swiping a finger across a fingerprint sensor that is placed in a specific location on the device. These actions are often perceived as cumbersome or too time consuming for high frequency use that is typical with smartphones. As a result, many users value convenience over security and do not leverage available security measures, thereby leaving their device and data exposed.

SUMMARY

A method including receiving sensed information corresponding to a contact signature of a user holding a device, generating a contact signature from the sensed information, comparing the contact signature to a library of contact signatures, and authenticating the user based on the comparison to provide access to functions on the device.

A machine readable storage device having instructions for execution by a processor of the machine to perform receiving sensed information corresponding to a contact signature of a user holding a device, generating a contact signature from the sensed information, comparing the contact signature to a library of contact signatures, and authenticating the user based on the comparison to provide access to functions on the device.

A device includes a processor, a sensor supported by the device, and a memory device coupled to the processor and having a program stored thereon for execution by the processor to receive sensed information from the sensor corresponding to a contact signature of a user holding a device, generate a contact signature from the sensed information, compare the contact signature to a library of contact signatures, and authenticate the user based on the comparison to provide access to functions on the device.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

Pressure sensing circuits (e.g. resistive and capacitive sensors), piezoelectric materials or other pressure-sensing solutions are embedded in or layered on top of a housing material for a handheld device like a smartphone, smart watch or other hand held electronic device. The sensing technology is positioned within the housing such that one or more sides of the device (possibly, but not necessarily including the display side) have pressing sensing capability to indicate contact mechanics applied to the device. As a result, this sensing capability can detect fully where a user's fingers and hand are gripping the device. In addition, the sensors on edge sides of the device may be sufficiently dense enough to detect finger print ridges of the user.

Figure 1:
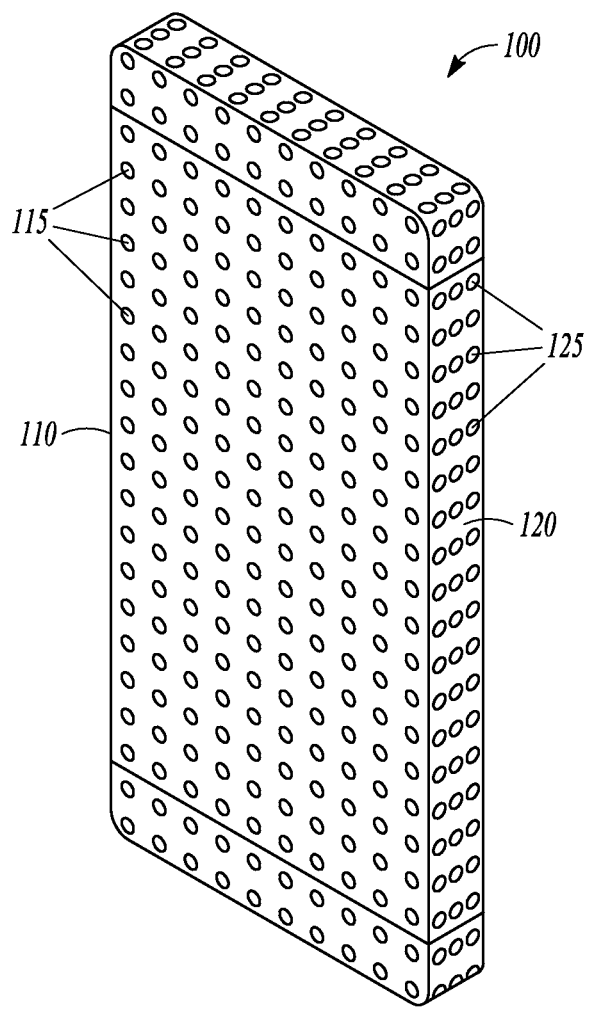
FIG. 1 is a perspective view of a hand held device having multiple sensors according to an example embodiment.

FIG. 1 is a perspective representation of a hand held device 100 having pressure sensing capability on left and right sides, and rear a housing 110. An array of sensors 115 are represented as dots covering the housing of the hand held device. In one embodiment, the housing 110 is the case of the hand held device supporting interior electronics, buttons, and touch screen on a front side of the device 100 not visible in FIG. 1. In further embodiments, the housing may take the form of an external case that is shaped to hold the device 100 and connect via one or more electrical connectors.

A side 120 of the housing 110 corresponds to an edge of the housing 110, and has a very high density of sensors 125 embedded, layers on top of, or otherwise disposed on the side 120. Sensors 125 may also be similarly disposed on other sides of the housing 110. The density of sensors 125 in one embodiment is sufficient to facilitate detection of ridges of skin on fingers corresponding to finger prints, which can server as a biometric verification of a user. The sensors 115 and 125 have pressing sensing capability to indicate contact mechanics applied to the device 100. As a result, this sensing capability can detect fully where a user's fingers and hand are gripping the device.

Figure 2:
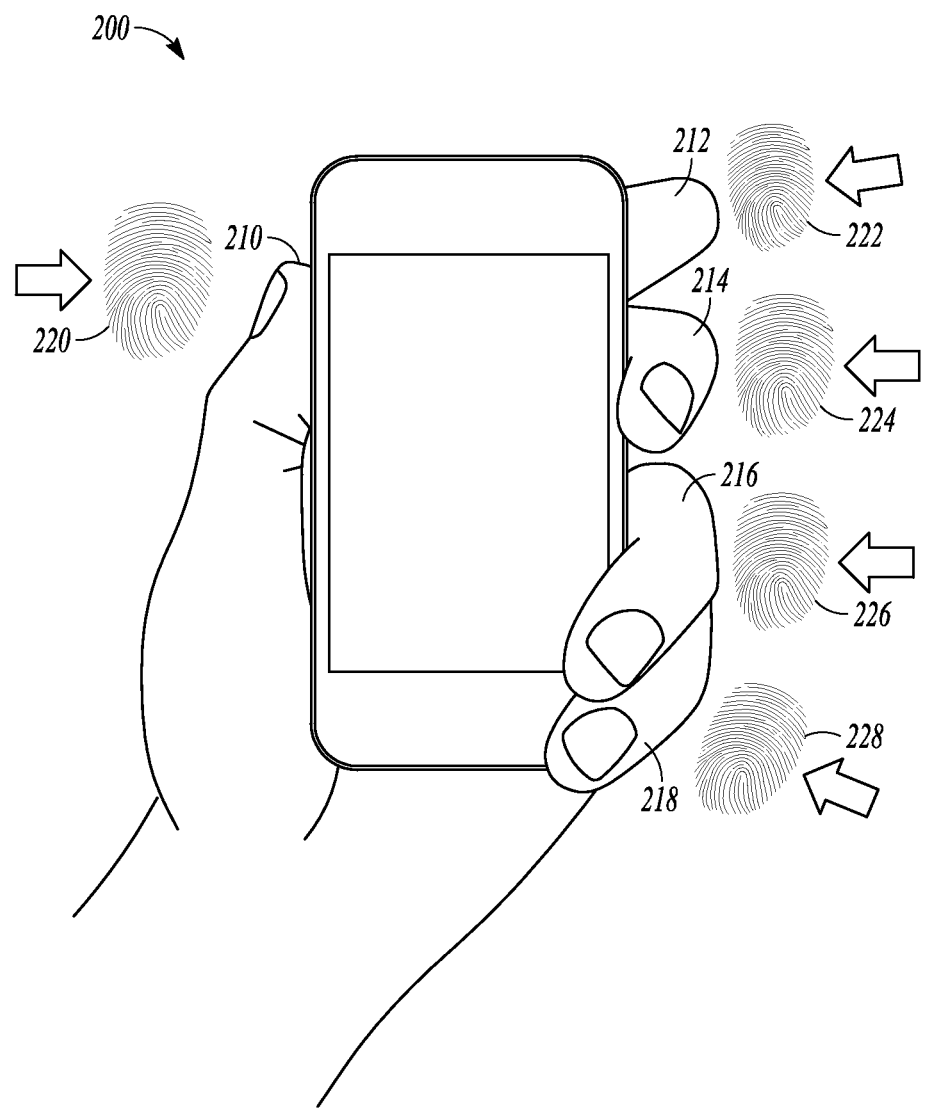
FIG. 2 is a representation of a hand held device being held by a user according to an example embodiment.

A natural grip of the device 100 as illustrated in FIG. 2 at 200 can be sensed by the sensors 115 and 125 to quickly authenticate the smartphone user with no conscious effort required from the user. Multiple fingers 210, 212, 214, 216, and 218 are shown with corresponding fingerprints 220, 222, 224, 226, and 228. FIG. 2 illustrates one example grip in which one or more fingers are at least partially contacting one or more edges of the device 200, resulting in sensors 115 and 125 detecting where the fingers are positioned. Such positioning and other data, such as the amount of pressure and area of coverage of each finger may be detected. Such data may be referred to as the contact mechanics, and may vary in different embodiments, by either including or excluding different types of data. Sensors 125 may also provide images of at least some partial prints from the fingers.

The data obtained from the sensors 115 and 125 may be used to perform security checking and authenticate a user holding the device 100. The security measures may be two-fold in various embodiments. General pressure sensing can determine a contact signature on the device 100 that maps to a specific user. The contact signature may be used to match hand size, finger size, finger spread, contact point location and applied pressure to known patterns of registered users. In further embodiments, high-density pressure sensing via sensors 125 in specific locations may be used to capture finger print images. Multiple, partial images of finger prints may be combined to create an aggregate fingerprint score.

In one embodiment, the contact signatures may include data representing a unique combination of characteristics, such as hand size, finger size, finger spread and location of these characteristics on the device. Pressure at multiple locations where the hand touches the device may also be included in the contact signature in further embodiments.

In still further embodiments, a contact signature score may be used for authentication and compared to an authentication score or threshold which may be set to varying levels of authentication desired. The contact signature score may represent a measure of how close the characteristics are to another contact signature from the library of contact signatures. Such scores may be generated based on known pattern matching algorithms in some embodiments. The score may be normalized to a number, such as 100 in some embodiments. The contact signature score and authentication score may be determined by the strength of all characteristics used at a given time when compared to a library of prior signatures.

Unique combinations of hand size, finger spread, quality of fingerprint(s), and others may be used to calculate an overall "authentication score." Each characteristic may be given a different weight in the overall score. To successfully authenticate, the overall score must reach a pre-determined threshold. Additionally, if data at a given moment regarding a specific characteristic is insufficient, stronger data from another characteristic may actually increase the score sufficiently. The weight and use of each characteristic in the scoring approach is thereby dynamic. In one embodiment, the data present at a given moment may be used to ensure the user can authenticate with ease while maintaining desired security.

Additionally, pattern libraries may be improved over time. As the user authenticates across subsequent uses of the smart device, contact signature and partial fingerprint data is logged to improve/increase frequency of true-positive results. When specific elements of the contact signature, such as partial print images, consistently map to specific elements of a fingerprint image, these elements of aggregated data may become leading indicators in a hierarchy of available data. In essence, the strength of multiple, partial matches in various data types may be leveraged to provide highly secure authentication of a user while enabling a flexible "natural grip" usage model for the user.

Figure 3:
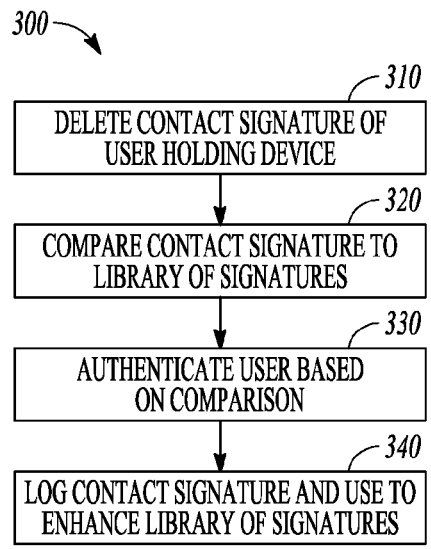
FIG. 3 is a flowchart illustrating a method of authenticating a user based on a contact signature derived from a hand held device according to an example embodiment.

FIG. 3 is a flowchart illustrating a method 300 of using a contact signature to authenticate a user of a device. At 310, a contact signature generated by a user holding a device is detected. The sensors on the device provide contact information corresponding to the contact signature. The contact signature may include sensed information from which hand size, finger size, finger spread, contact point location, applied pressure and other characteristics may be generated.

The contact signature is compared at 320 to a library of signatures of known users. The contact signature may include one or more of the generated characteristics. The library of signatures may include signatures and variations of signatures used by a known user of the device, and may stored on the device or in remote processing resources accessible by device. In further embodiments, the library of signatures may include signatures of multiple users that is searched to match the user holding the device. In either event, the signatures may be protected from access to ensure that the authentication process is secure. Thus, method 300 may execute on the device, or the sensed data may be sent to a remote server such as a cloud based server for execution of portions of the process 300, including authentication of the user at 330.

At 340, the detected contact signature may be logged and added to the library of signatures as an example of a signature corresponding to an authenticated user. This may server to enhance the library of signatures and subsequent comparisons by including the logged signature as a signature that authenticates the user.

Figure 4:
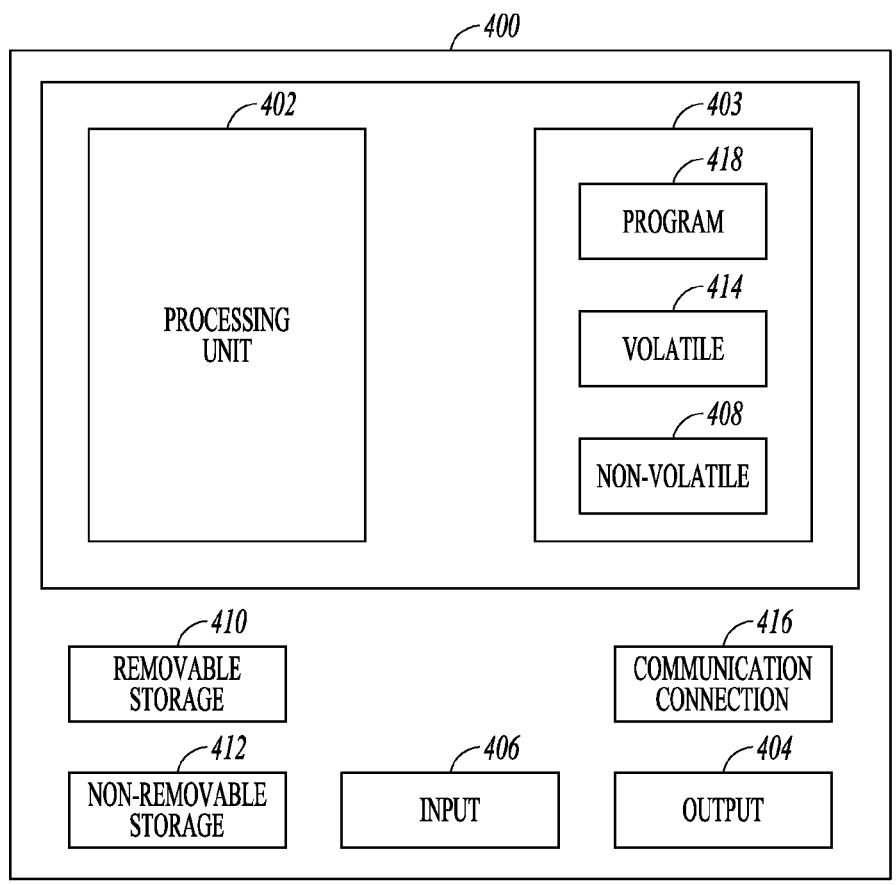
FIG. 4 is a block diagram of computer system used to implement methods according to an example embodiment.

FIG. 4 is a block schematic diagram of a computer system 400 to implement device 100 and other computing resources according to example embodiments. All components need not be used in various embodiments. One example computing device in the form of a computer 400 may include a processing unit 402, memory 403, removable storage 410, and non-removable storage 412. Sensors 115 and 125 may be coupled to provide data to the processing unit 402. Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 400 may include or have access to a computing environment that includes input 406, output 404, and a communication connection 416. Output 404 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 400. A hard drive, CD-ROM, and RAM are some examples of articles including a non-transitory computer-readable medium. For example, a computer program 418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 400 to provide generic access controls in a COM based computer network system having multiple users and servers.

EXAMPLES

1. A method comprising:
receiving sensed information corresponding to a contact signature of a user holding a device;
generating a contact signature from the sensed information;
comparing the contact signature to a library of contact signatures; and
authenticating the user based on the comparison to provide access to functions on the device.

2. The method of example 1 wherein the sensed information comprises sensed pressure detected by an array of pressure sensors.

3. The method of any of examples 1-2 wherein the contact signature includes contact point locations of a hand and fingers, hand size, finger size, and finger spread on the device.

4. The method of any of examples 1-3 wherein comparing the contact signature to a library of contact signatures includes generating a weighted score based on a plurality of sensed characteristics of the contact signature compared to a signature in the library of contact signatures.

5. The method of any of examples 1-4 wherein the contact signature includes contact points and applied pressure on the device.

6. The method of any of examples 1-5 and further comprising logging each contact signature that results in authentication of a user.

7. The method of example 6 and further comprising using logged contact signatures to enhance the library of signatures.

8. The method of example 7 wherein the contact signature includes hand size, finger size, finger spread, contact point location, applied pressure.

9. The method of any of examples 1-8 wherein the contact signature includes a finger print image of a user holding the device.

10. The method of any of examples 1-9 wherein the contact signature includes multiple partial finger print images of a user holding the device.

11. A machine readable storage device having instructions for execution by a processor of the machine to perform:
receiving sensed information corresponding to a contact signature of a user holding a device;
generating a contact signature from the sensed information;
comparing the contact signature to a library of contact signatures; and
authenticating the user based on the comparison to provide access to functions on the device.

12. The computer readable storage device of example 11 wherein the sensed information comprises sensed pressure detected by an array of pressure sensors.

13. The computer readable storage device of any of examples 11-12 wherein the method further comprises:
logging each contact signature that result in authentication of a user; and
using logged contact signatures to enhance the library of signatures.

14. The computer readable storage device of any of examples 11-13 wherein the contact signature includes a finger print image of a user holding the device.

15. The computer readable storage device of any of examples 11-14 wherein the contact signature includes multiple partial finger print images of a user holding the device.

16. A device comprising:
a processor;
a sensor supported by the device; and
a memory device coupled to the processor and having a program stored thereon for execution by the processor to:
receive sensed information from the sensor corresponding to a contact signature of a user holding a device;
generate a contact signature from the sensed information;
compare the contact signature to a library of contact signatures; and
authenticate the user based on the comparison to provide access to functions on the device.

17. The device of example 16 and further comprising:
a case enclosing the processor and memory device; and
wherein the sensor comprises an array of pressure sensors coupled to the case to sense holding of the case by a user.

18. The device of example 17 and further comprising a touch screen supported by the case.

19. The device of any of examples 16-18 wherein the program further causes the processor to log each contact signature that results in authentication of a user.

20. The device of example 19 wherein the program further causes the processor to use logged contact signatures to enhance the library of signatures.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A method comprising:
receiving sensed finger pressure information corresponding to a user holding a locked smart device, the sensed information received from an array of pressure sensors disposed on a back and sides of the device, wherein a density of sensors on the sides of the device is greater than the density of sensors on the back and wherein two or more of any of the pressure sensors are utilized for sensing multiple partial finger prints resulting from a natural grip of the device;
receiving sensed fingerprint information of the user from one or more of the pressure sensors on the sides of the device;
generating a contact signature from the sensed finger pressure information using one or more programmed processors, the contact signature corresponding to contact mechanics applied to the device by the user holding the device, wherein the contact mechanics are sensed from the array of pressure sensors disposed on the back and sides of the device, and wherein the contact signature includes multiple characteristics including two or more of: contact point locations of a hand, contact point locations of a finger, hand size, finger size, and finger spread on the device;
generating a fingerprint characteristic from the sensed fingerprint information;
comparing the fingerprint characteristic and the multiple characteristics of the contact signature to a library of contact signatures using the one or more processors, wherein the comparing comprises calculating an authentication score, wherein the calculating an authentication score comprises comparing each of the fingerprint characteristics and the multiple characteristics to at least one of the contact signatures within the library, each of the fingerprint characteristics and the multiple characteristics having a dynamic weight responsive to a strength of data representing each of the fingerprint characteristics and the multiple characteristics in the calculation of the authentication score; and responsive to a successful comparison, authenticating the user to unlock the device using the one or more processors, wherein a successful comparison comprises a comparison where the authentication score reaches a predetermined threshold.

2. The method of claim 1 wherein the sensed finger pressure information comprises sensed pressure detected by the array of pressure sensors and wherein the smart device is a smartphone, and wherein the multiple partial finger prints are combined to create an aggregate finger print score that is included in a contact signature score.

3. The method of claim 1 wherein each partial fingerprint is weighted with a dynamic weight responsive to a strength of data representing the each partial fingerprint to create a contact signature score that includes an aggregate finger print score derived from the multiple partial finger prints.

4. The method of claim 1 wherein the contact signature includes contact points and applied pressure on the device.

5. The method of claim 1 and further comprising logging each contact signature that results in authentication of a user.

6. The method of claim 5 and further comprising using logged contact signatures to enhance the library of contact signatures, wherein when specific elements of the contact signature consistently map to specific elements of a fingerprint image, the specific elements of the fingerprint image become leading indicators in a hierarchy of available data.

7. The method of claim 6, wherein multiple partial images of the finger prints are combined to create an aggregate fingerprint score, and the aggregate fingerprint score is weighted lower than other characteristics responsive to the multiple partial finger prints being insufficient.

8. The method of claim 1 wherein the contact signature includes a finger print image of a user holding the device.

9. The method of claim 1 wherein the contact signature includes multiple partial finger print images of a user holding the device.

10. A machine readable storage device having instructions for execution by a processor of the machine to cause the processor of the machine to perform:

receiving sensed finger pressure information corresponding to a contact signature representative of contact mechanics of a user holding the device, the sensed information received from an array of pressure sensors disposed on a back and sides of the device, wherein a density of sensors on the sides of the device is greater than the density of sensors on the back and wherein two or more of any of the sensors are utilized for sensing multiple partial finger prints resulting from a natural grip of the device;

receiving sensed fingerprint information of the user from one or more of the pressure sensors on the sides of the device;

generating the contact signature from the sensed finger pressure information using one or more programmed processors, the contact signature corresponding to contact mechanics applied to the device by the user holding the device, wherein the contact mechanics are sensed from the array of pressure sensors disposed on the back and sides of the device, wherein the contact signature includes multiple characteristics including two or more of: contact point locations of a hand, contact point locations of a finger, hand size, finger size, and finger spread on the device;

generating a fingerprint characteristic from the sensed fingerprint information;

comparing the fingerprint characteristic and the multiple characteristics of the contact signature to a library of contact signature using the processor, wherein the comparing comprises calculating an authentication score, wherein the calculating an authentication score comprises comparing each of the fingerprint characteristics and the multiple characteristics to at least one of the contact signatures within the library, each of the fingerprint characteristics and the multiple characteristics having a dynamic weight responsive to a strength of data representing each of the fingerprint characteristics and the multiple characteristics in the calculation of the authentication score; and responsive to a successful comparison, authenticating the user to unlock the device using the one or more processors, wherein a successful comparison comprises a comparison where the authentication score reaches a predetermined threshold.

11. The machine readable storage device of claim 10 wherein the instructions further cause the processor of the machine to perform:

logging each contact signature that result in authentication of a user; and using logged contact signatures to enhance the library of signatures.

12. The machine readable storage device of claim 10 wherein each partial fingerprint is weighted with a dynamic weight responsive to a strength of data representing the each partial fingerprint to create a contact signature score that includes an aggregate finger print score derived from the multiple partial finger prints.

13. A smart device comprising:

a processor;

a sensor supported by the device; and a memory device coupled to the processor;

a case enclosing the processor and memory device;

a touchscreen disposed on a front of the case;

wherein the sensor comprises arrays of pressure sensors disposed on a back and sides of the case, and wherein a density of sensors on the sides of the device is greater than the density of sensors on the back of the device and are suitable for detecting ridges of skin of fingers to sense multiple partial finger prints of a user holding the case with a natural grip to view the touchscreen;

the memory device having a program stored thereon for execution by the processor to:

receive sensed finger pressure information from the sensor corresponding to a contact signature representative of contact mechanics, including finger prints of a user holding the smart device;

receive sensed fingerprint information of the user from one or more of the pressure sensors on the sides of the device;

generate the contact signature from the sensed finger pressure information, wherein the contact signature includes multiple characteristics including two or more of: contact point locations of a hand, contact point locations of a finger, hand size, finger size, and finger spread on the device;

generate a fingerprint characteristic from the sensed fingerprint information;

compare the fingerprint characteristic and the multiple characteristics of the contact signature to a library of contact signatures, wherein the comparing comprises calculating an authentication score, wherein the calculating an authentication score comprises comparing each of the fingerprint characteristics and the multiple characteristics to at least one of the contact signatures within the library, each of the fingerprint characteristics and the multiple characteristics having a dynamic weight responsive to a strength of data representing each of the fingerprint characteristics and the multiple characteristics in the calculation of the authentication score; and responsive to a successful comparison, authenticating the user to unlock the device using the one or more processors, wherein a successful comparison comprises a comparison where the authentication score reaches a predetermined threshold.

14. The device of claim 13 wherein each partial fingerprint is weighted with a dynamic weight responsive to a strength of data representing the each partial fingerprint to create a contact signature score that includes an aggregate finger print score derived from the multiple partial finger prints.

15. The device of claim 13 wherein the program further causes the processor to log each contact signature that results in authentication of a user and use logged contact signatures to enhance the library of signatures, and wherein when specific elements of the contact signature consistently map to specific elements of a fingerprint image, the specific elements of fingerprint image become leading indicators in a hierarchy of available data.

\* \* \* \* \*